United States Patent
Arinaga et al.

(10) Patent No.: US 8,527,104 B2
(45) Date of Patent: Sep. 3, 2013

(54) WIND TURBINE GENERATOR SYSTEM AND OPERATION CONTROL METHOD THEREFOR

(75) Inventors: Shinji Arinaga, Nagasaki (JP); Takatoshi Matsushita, Nagasaki (JP); Tsuyoshi Wakasa, Nagasaki (JP); Masaaki Shibata, Nagasaki (JP); Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 373 days.

(21) Appl. No.: 12/674,539

(22) PCT Filed: Dec. 14, 2007

(86) PCT No.: PCT/JP2007/074111
§ 371 (c)(1),
(2), (4) Date: Jun. 10, 2010

(87) PCT Pub. No.: WO2009/078073
PCT Pub. Date: Jun. 25, 2009

(65) Prior Publication Data
US 2011/0112697 A1    May 12, 2011

(51) Int. Cl.
*G05D 19/02*    (2006.01)
(52) U.S. Cl.
USPC ............ 700/287; 700/286; 700/281; 700/297
(58) Field of Classification Search
None
See application file for complete search history.

(56) References Cited

U.S. PATENT DOCUMENTS

| | | | |
|---|---|---|---|
| 6,724,097 B1 | 4/2004 | Wobben | |
| 6,856,040 B2* | 2/2005 | Feddersen et al. | 290/44 |
| 6,924,565 B2* | 8/2005 | Wilkins et al. | 290/44 |
| 7,166,928 B2 | 1/2007 | Larsen | |
| 7,224,081 B2 | 5/2007 | Larsen | |
| 7,642,666 B2* | 1/2010 | Ichinose et al. | 290/44 |
| 7,804,183 B2* | 9/2010 | Arinaga | 290/44 |
| 2003/0011348 A1* | 1/2003 | Lof et al. | 322/37 |
| 2005/0040655 A1* | 2/2005 | Wilkins et al. | 290/44 |
| 2005/0046196 A1* | 3/2005 | Larsen | 290/44 |
| 2005/0286179 A1* | 12/2005 | Huff et al. | 361/20 |
| 2006/0255594 A1* | 11/2006 | Larsen | 290/44 |

(Continued)

FOREIGN PATENT DOCUMENTS

| | | |
|---|---|---|
| JP | 62242126 A | 10/1987 |
| JP | 08-126204 | 5/1996 |

(Continued)

OTHER PUBLICATIONS

Jose Luis Rodriguez-Amenedo et al., Automatic Generation Control of a Wind Farm with Variable Speed Wind Turbines, IEEE Transactions on Energy Conversion, vol. 17, No. 2, Jun. 2002, pp. 279-284.*

(Continued)

*Primary Examiner* — Kavita Padmanabhan
*Assistant Examiner* — Christopher E Everett
(74) *Attorney, Agent, or Firm* — Kanesaka Berner & Partners, LLP

(57) ABSTRACT

An object is to improve the accuracy of reactive power adjustment. Reactive-power command values corresponding to individual wind turbines are determined by correcting a predetermined reactive-power command value for an interconnection node A using reactive power correction levels set for the individual wind turbines.

7 Claims, 4 Drawing Sheets

(56) References Cited

U.S. PATENT DOCUMENTS

| | | | |
|---|---|---|---|
| 2006/0273595 A1* | 12/2006 | Avagliano et al. | 290/44 |
| 2007/0228838 A1* | 10/2007 | Delmerico et al. | 307/84 |
| 2008/0143304 A1* | 6/2008 | Bose et al. | 323/205 |
| 2010/0250012 A1* | 9/2010 | Arinaga et al. | 700/287 |
| 2011/0204630 A1* | 8/2011 | Arinaga et al. | 290/44 |

FOREIGN PATENT DOCUMENTS

| | | |
|---|---|---|
| JP | 09135538 A | 5/1997 |
| JP | 11-041990 | 2/1999 |
| JP | 2000-078896 | 3/2000 |
| JP | 2003511615 | 3/2003 |
| WO | WO 2006088078 A1 * | 8/2006 |

OTHER PUBLICATIONS

J.L. Rodriguez-Amenedo et al., Operation and coordinated control of fixed and variable speed wind farms, Renewable Energy, vol. 33, 2008 (available online Apr. 27, 2007), pp. 406-414.*

Office Action for JP 2009-546087 dated Dec. 6, 2011, (with English translation).

ISR for PCT/JP2007/074111 dated Mar. 18, 2008.

Chinese Notification of the Grant of Patent for Application No. 200780100575.9 mailed Oct. 17, 2012.

Notice of Acceptance as issued on Jun. 4, 2013 for corresponding Australian Patent Application No. 2007362449.

* cited by examiner

WIND TURBINE GENERATOR SYSTEM AND OPERATION CONTROL METHOD THEREFOR

RELATED APPLICATIONS

The present application is national phase of, and claims priority from, International Application Number PCT/JP2007/074111 filed Dec. 14, 2007, the disclosure of which is hereby incorporated by reference herein in its entirety.

TECHNICAL FIELD

The present invention relates to wind turbine generator systems and operation control methods therefor.

BACKGROUND ART

For power control at an interconnection node in a wind farm, conventionally, as disclosed in, for example, Patent Citations 1 and 2, it is suggested that a central controller transmit a uniform reactive power command to individual wind turbines so that the individual wind turbines control generators based on the reactive power command.
Patent Citation 1:
U.S. Pat. No. 7,166,928, specification
Patent Citation 2:
U.S. Pat. No. 7,224,081, specification

DISCLOSURE OF INVENTION

Recently, there has been a demand for increased voltage stability of utility grids, and further stabilization of the voltage at an interconnection node is required accordingly. The conventional technique described above, however, has a problem in that the power at the interconnection node cannot be efficiently stabilized because a uniform reactive power command is provided to the individual wind turbines.

An object of the present invention, which has been made to solve the above problem, is to provide a wind turbine generator system and an operation control method therefor in which the voltage at an interconnection node can be efficiently stabilized.

To solve the above problem, the present invention employs the following solutions.

A first aspect of the present invention is an operation control method for a wind turbine generator system including a plurality of wind turbines and a central controller for providing control commands to the individual wind turbines, and output powers of the individual wind turbines are supplied to a utility grid via a common interconnection node. Reactive-power command values corresponding to the individual wind turbines are determined by correcting a predetermined reactive-power command value for the interconnection node using reactive power correction levels set for the individual wind turbines.

According to the above operation control method for the wind turbine generator system, because the predetermined reactive-power command value for the interconnection node is corrected using the reactive power correction levels corresponding to the individual wind turbines, different reactive-power command values can be set for the individual wind turbines. This allows power control of the individual wind turbines based on appropriate reactive-power command values taking into account, for example, the properties related to the individual wind turbines, thus improving voltage stability at the grid node.

In the above operation control method for the wind turbine generator system, the reactive power correction levels may be determined based on reactance components present between the individual wind turbines and the interconnection node.

Thus, because the reactive-power command values for the individual wind turbines are determined using the reactive power correction levels taking into account the reactance components present between the wind turbines and the interconnection node, the reactive power at the interconnection node can be efficiently adjusted to the predetermined reactive-power command value.

For example, if simple feedback control is performed to adjust the actual reactive power at the interconnection node to the reactive-power command value without taking into account the reactance components present between the individual wind turbines and the interconnection node, it is possible to adjust the reactive powers at output ends of generation systems of the individual wind turbines to the reactive-power command value provided to the individual wind turbines, although it is difficult to adjust the reactive power at the interconnection node to the predetermined reactive-power command value. This is because the reactive power varies depending on, for example, the reactances of power lines connecting the output ends of the wind turbines to the interconnection node. In this respect, according to the present invention, further stabilization of the reactive power at the interconnection node can be easily realized because the individual wind turbines are controlled based on the reactive-power command values taking into account the reactance components present between the individual wind turbines and the interconnection node.

A second aspect of the present invention provides an operation control method for a wind turbine generator system including a plurality of wind turbines and a central controller for providing control commands to the individual wind turbines, and outputs of the individual wind turbines are supplied to a utility grid via a common interconnection node. If the plurality of wind turbines include both variable-speed wind turbines and fixed-speed wind turbines, the overall reactive power of the fixed-speed wind turbines at the interconnection node is calculated, the difference between the calculated reactive power and a predetermined reactive-power command value for the interconnection node is calculated, the predetermined reactive-power command value is corrected using the calculated difference, and reactive-power command values for the individual variable-speed wind turbines are determined based on the corrected predetermined reactive-power command value.

According to this method, because the reactive-power command values for the variable-speed wind turbines are determined by taking into account variations in reactive power due to the fixed-speed wind turbines, the variations in reactive power due to the fixed-speed wind turbines can be absorbed by reactive power control of the variable-speed wind turbines. This improves the stability of the reactive power at the interconnection node even if fixed-speed wind turbines and variable-speed wind turbines are both present.

In the above operation control method for the wind turbine generator system, the reactive-power command values corresponding to the individual variable-speed wind turbines may be determined by correcting the corrected predetermined reactive-power command value using reactive power correction levels set for the individual variable-speed wind turbines.

Thus, because the reactive-power command values for the individual variable-speed wind turbines are determined by further correcting the predetermined reactive-power command value for the interconnection node, corrected by taking into account the variations in the reactive powers of the fixed-speed wind turbines, using the reactive power correction levels set for the individual variable-speed wind turbines, different reactive-power command values can be set for the individual variable-speed wind turbines. This allows reactive power control of the individual variable-speed wind turbines based on appropriate reactive-power command values taking into account, for example, the properties related to the individual variable-speed wind turbines, thus further improving the stability of the reactive power at the interconnection node.

In the above operation control method for the wind turbine generator system, the reactive power correction levels corresponding to the individual variable-speed wind turbines may be determined based on reactance components present between the individual variable-speed wind turbines and the interconnection node.

Thus, because the reactive-power command values for the individual variable-speed wind turbines are determined by taking into account the reactance components present between the wind turbines and the interconnection node, the reactive power at the interconnection node can be efficiently adjusted to the reactive-power command value.

A third aspect of the present invention is a wind turbine generator system including a plurality of wind turbines and a central controller for providing control commands to the individual wind turbines, and output powers of the individual wind turbines are supplied to a utility grid via a common interconnection node. Reactive-power command values corresponding to the individual wind turbines are determined by correcting a predetermined reactive-power command value for the interconnection node using reactive power correction levels set for the individual wind turbines.

A fourth aspect of the present invention is a wind turbine generator system including a plurality of wind turbines and a central controller for providing control commands to the individual wind turbines, and outputs of the individual wind turbines are supplied to a utility grid via a common interconnection node. If the plurality of wind turbines include both variable-speed wind turbines and fixed-speed wind turbines, the central controller calculates the overall reactive power of the fixed-speed wind turbines at the interconnection node, calculates the difference between the calculated reactive power and a predetermined reactive-power command value for the interconnection node, corrects the predetermined reactive-power command value using the calculated difference, and determines reactive-power command values for the individual variable-speed wind turbines based on the corrected predetermined reactive-power command value.

The present invention provides the advantage of improving the accuracy of reactive power adjustment.

EXPLANATION OF REFERENCE

1: wind turbine generator system
10: central controller
20: generation system
30: power line
WTG1, WTG2, WTGn: wind turbine

BEST MODE FOR CARRYING OUT THE INVENTION

Individual embodiments of wind turbine generator systems and operation control methods therefor according to the present invention will be described below with reference to the drawings.

First Embodiment

Figure 1:
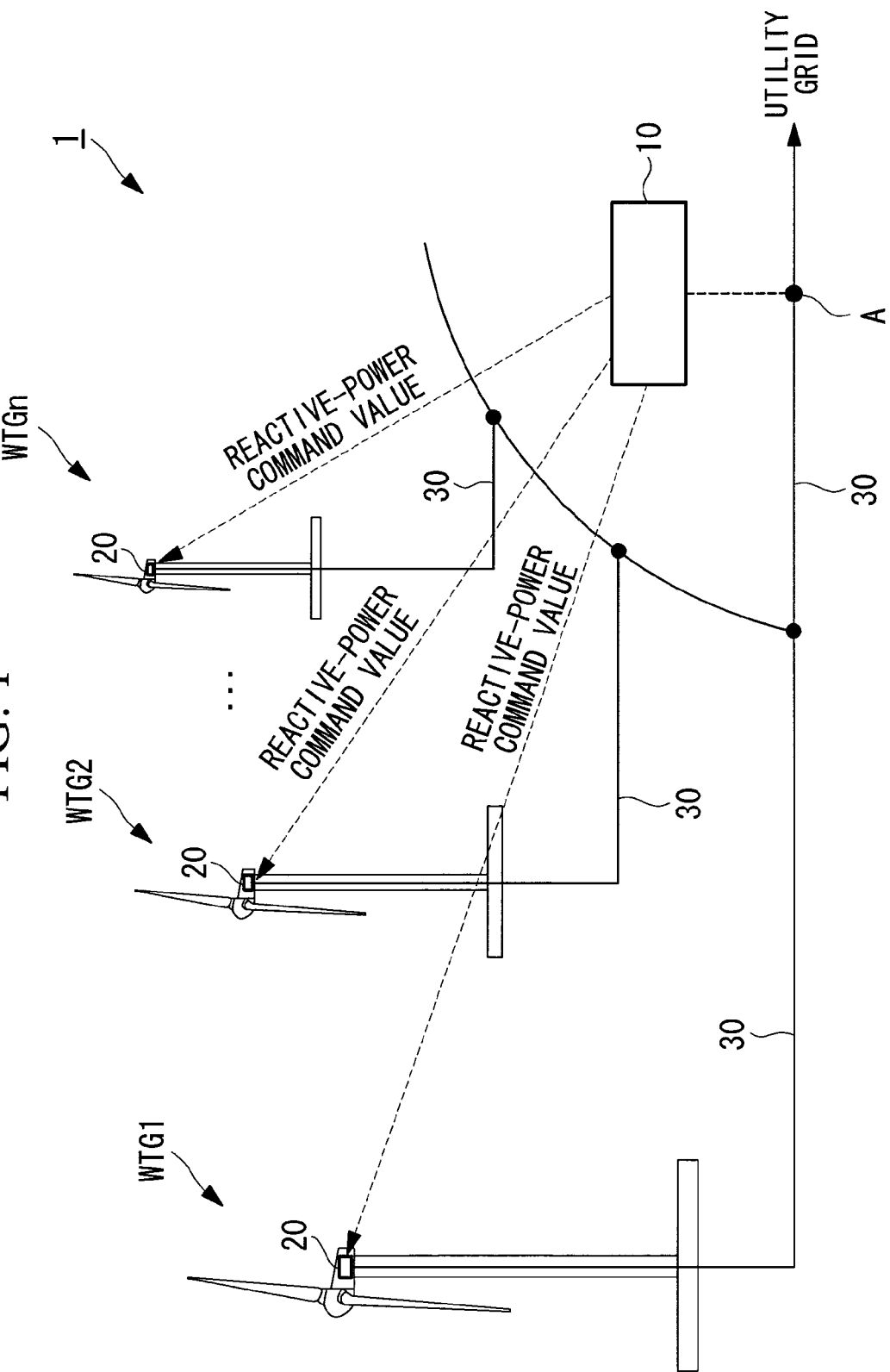
FIG. 1 is a diagram showing the entire configuration according to a first embodiment of the present invention.

FIG. 1 is a block diagram showing the entire configuration of a wind turbine generator system according to this embodiment. As shown in FIG. 1, a wind turbine generator system 1 includes a plurality of wind turbines WTG1, WTG2, . . . , WTGn (hereinafter denoted simply by the reference sign "WTG" when all wind turbines are referred to and denoted by the reference signs "WTG1", "WTG2", etc. when the individual wind turbines are referred to) and a central controller 10 for providing control commands to the individual wind turbines WTG. In this embodiment, all wind-power generators WTG are variable-speed wind turbines.

Each wind turbine WTG includes a generation system 20. The generation system 20 includes, as the main configuration thereof, for example, a generator, a variable-frequency converter excitation system capable of controlling the active power and the reactive power of the generator, and a wind turbine controller for providing a power command value to the variable-frequency converter excitation system.

The powers output from the generation systems 20 of the individual wind turbines are supplied through respective power lines 30 to a utility grid via a common interconnection node A.

The central controller 10 sets a reactive-power command value for the interconnection node A based on a requested-reactive-power command for the interconnection node A provided from a power management room managing grid power (for example, an electric utility). The reactive-power command value is corrected using reactive power correction levels set for the individual wind turbines WTG1, WTG2, . . . , WTGn, and the corrected reactive-power command values are transmitted to the respective wind turbines. Here the details of the reactive power correction levels set for the individual wind turbines will be described later.

When the generation system 20 of each wind turbine WTG1, WTG2, . . . , WTGn receives the reactive-power command value provided from the central controller 10, it controls the generator based on the reactive-power command value and an active-power command value set depending on the rotational speed of the generator. At this time, the reactive-power command value and the active-power command value are set within the operating range depending on thermal constraints and voltage limitations.

In the generation system 20, specifically, the reactive-power command value and the active-power command value are provided to the variable-frequency converter excitation system. The variable-frequency converter excitation system generates a d-q axis rotor current command based on the reactive-power command value and the active-power command value to control a variable-speed converter of the generator based on the rotor current command. Thus, the desired active power and the desired reactive power are output.

With the above rotor current control, reactive powers satisfying the reactive-power command values provided to the individual wind turbines and so on are output from the respective wind turbines WTG and are supplied to the common interconnection node A through the power lines 30.

Next, the reactive power correction levels set for the individual wind turbines WTG1, WTG2, . . . , WTGn described above will be described in detail.

The above reactive power correction levels are determined based on reactance components present between the individual wind turbines WTG1, WTG2, . . . , WTGn and the interconnection node A.

In a wind farm having many wind turbines, for example, the lengths of the power lines 30 connecting the individual wind turbines WTG1, WTG2, . . . , WTGn and the interconnection node A differ greatly. Accordingly, the reactive powers output from the wind turbines are affected by the reactances corresponding to the distances over the respective power lines 30 before reaching the interconnection node A. As a result, for example, if a uniform reactive-power command value is provided to the individual wind turbines, variations in the reactive power at the interconnection node A can occur and decrease the accuracy of voltage adjustment.

This embodiment takes into account the power variations, described above, due to the reactance components of the power lines 30 to correct the reactive-power command value provided to the individual wind turbines depending on the reactance components of the above power lines.

Figure 2:
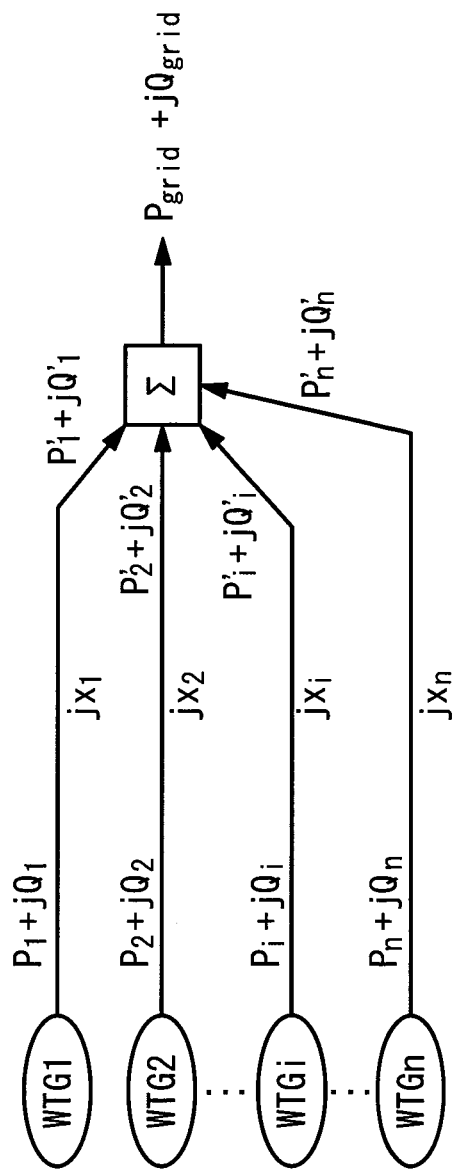
FIG. 2 is a diagram illustrating reactive power correction levels according to the first embodiment of the present invention.

First, as shown in FIG. 2, let the powers at the output ends of the individual wind turbines WTG1, WTG2, . . . , WTGi, . . . , WTGn be $P_1+jQ_1$, $P_2+jQ_2$, . . . , $P_i+jQ_i$, . . . , $P_n+jQ_n$, respectively. In addition, let the reactances of the power lines between the individual wind turbines WTG1, WTG2, . . . , WTGi, . . . , WTGn and the interconnection node A be $jx_1, jx_2, \ldots, jx_i, \ldots, jx_n$, respectively, and the powers of the individual wind turbines at the interconnection node A are defined as $P_1'+jQ_1'$, $P_2'+jQ_2'$, . . . , $P_i'+jQ_i'$, . . . , $P_n'+jQ_n'$, respectively.

Next, power flow calculation is performed for each wind turbine. Here the i-th wind turbine will be described as an example. For convenience, let interconnection node voltage $V_{grid}=1$ pu and interconnection node voltage phase angle $\delta_{grid}=0$. In addition, let the direction from each wind turbine toward the interconnection node A be positive in sign for both the active power P and the reactive power Q.

Under such conditions, the active power $P_i$ and the reactive power $Q_i$ at the output end of the wind turbine WTGi and the active power $P_i'$ and the reactive power $Q_i'$ at the interconnection node A are represented, respectively, as in equations (1) to (4) below.

[Eq. 1]

$$P_i = \frac{1}{x_i} V_i \sin\delta_i \quad (1)$$

$$P_i' = \frac{1}{x_i} V_i \sin\delta_i \quad (2)$$

$$Q_i = \frac{1}{x_i} V_i^2 - \frac{1}{x_i} V_i \cos\delta_i \quad (3)$$

$$Q_i' = \frac{1}{x_i} V_i \cos\delta_i + \frac{1}{x_i} \quad (4)$$

Equations (3) and (4) above, which are related to the reactive powers, are used to derive equation (5) below.

[Eq. 2]

$$Q_i - Q_i' = \frac{1}{x_i}(V_i^2 - 1) \quad (5)$$

Letting the rate of change from $Q_i$ in equation (5) above be $w_i$, equation (6) below is obtained.

[Eq. 3]

$$w_i = \frac{Q_i - Q_i'}{Q_i} = \frac{V_i^2 - 1}{x_i Q_i} \quad (6)$$

Letting $P_i$ and $Q_i$ be known in equations (1) to (4) above, $P_i'$, $Q_i'$, $V_i$, and $\delta_i$ can be solved.

An appropriate reactive power $Q_i$ and an appropriate active power $P_i$ are set by, for example, acquiring data on the reactive power $Q_i$ and the active power $P_i$ over a past predetermined period of time (for example, one month, three months, or one year) and analyzing the data (for example, by averaging).

The rate of change $w_i$ shown in equation (6) above is set as the reactive power correction level.

The rates of change $w_i$ determined for the individual wind turbines are stored in a memory of the central controller 10 in association with the respective wind turbines and are used for correction of the reactive-power command value in the operation of the wind turbines.

The above reactive power correction levels stored in the memory may be updated, for example, at predetermined time intervals (for example, every one year or three months). For updating, the reactive powers $Q_i$ and the active powers $P_i$ at the output ends of the wind turbines may be set to appropriate values, for example, as described above, may be set using, for example, the analytical results of data over a past predetermined period of time, and these values may be substituted into equation (6) above to update the reactive power correction levels for the individual wind turbines.

Next, an operation control method for the wind turbine generator system having the above configuration will be described.

Figure 3:
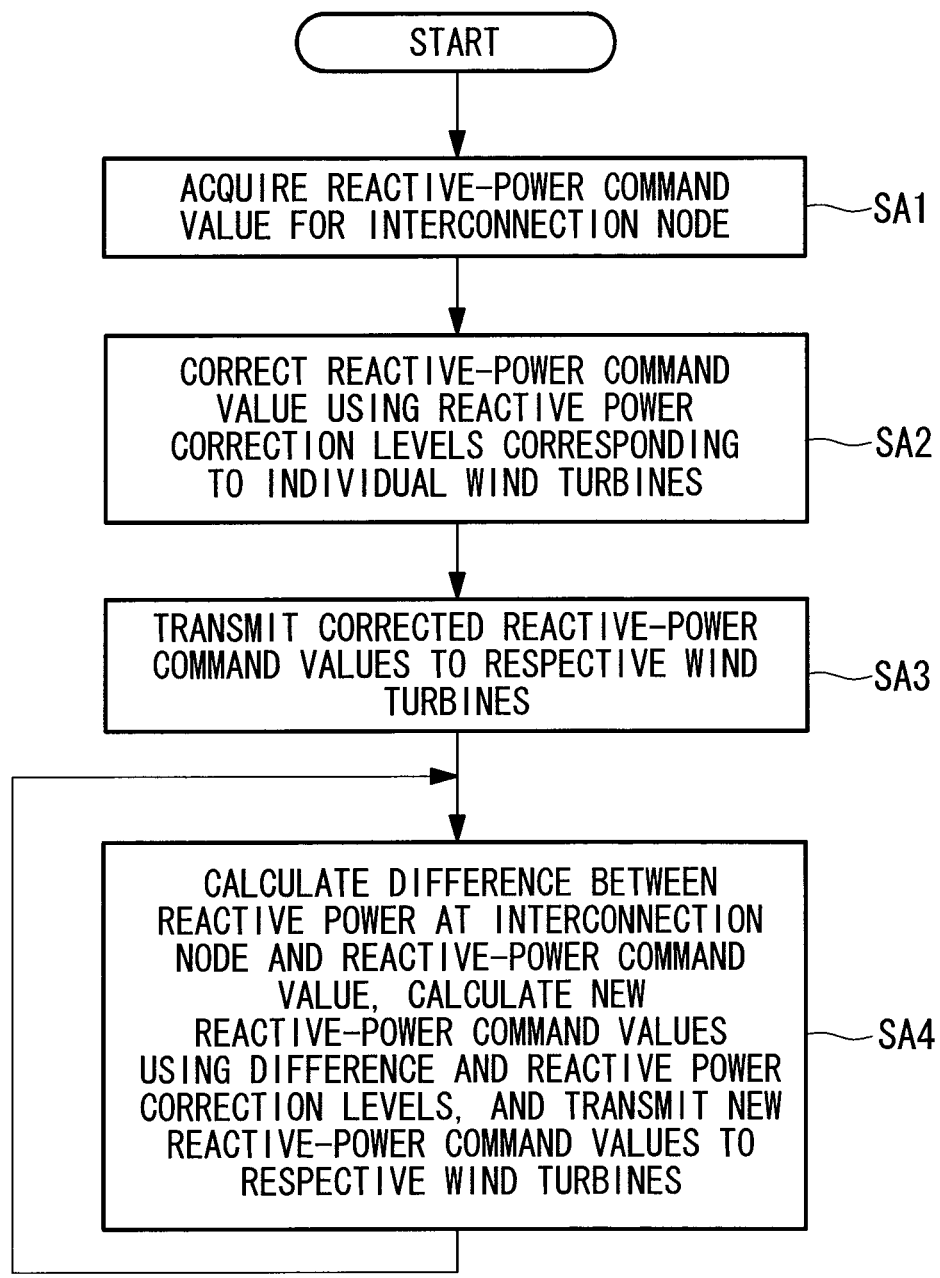
FIG. 3 is a flowchart showing a procedure of an operation control method for the wind turbine generator system according to the first embodiment of the present invention.

First, upon acquisition of the reactive-power command value $Q_{grid}$ for the interconnection node (Step SA1 in FIG. 3), the central controller 10 reads the reactive power correction levels $w_i$ corresponding to the individual wind turbines WTG1, WTG2, . . . , WTGn from the memory and corrects the reactive-power command value $Q_{grid}$ using the reactive power correction levels $w_i$ and equation (7) below to calculate the reactive-power command values $Q_i$ corresponding to the individual wind turbines (Step SA2).

[Eq. 4]

$$Q_i = (1 + w_i)\frac{Q_{grid}}{N} \quad (7)$$

In equation (7), N is the number of wind turbines.

After calculating the reactive-power command values $Q_1$, $Q_2$, . . . , $Q_n$ corresponding to the individual wind turbines WTG1, WTG2, . . . , WTGn, the central controller 10 transmits them to the respective wind turbines (Step SA3).

The generation systems of the individual wind turbines WTG1, WTG2, . . . , WTGn control the generators based on the reactive-power command values $Q_1, Q_2, \ldots, Q_n$ received from the central controller 10 and active-power command values set depending on the rotational speeds of the generators. Thus, reactive powers matching the reactive-power command values provided to the individual wind turbines are output from the output ends of the respective wind turbines and are supplied to the common interconnection node A through the power lines 30.

The central controller 10 detects the actual reactive power $Q_{grid}'$ at the interconnection node A, calculates the difference $\Delta Q_{grid}$ between the actual reactive power $Q_{grid}'$ and the reactive-power command value $Q_{grid}$, calculates new reactive-power command values so as to offset that difference $\Delta Q_{grid}$, and provides them as the next reactive-power command values to the respective wind turbines (Step SA4).

The new reactive-power command values are determined by adding the difference $\Delta Q_{grid}$ and the reactive power correction levels $w_i$ to the reactive-power command value $Q_{grid}$ for the interconnection node A acquired in Step SA1, as in equation (8) below.

[Eq. 5]

$$Q_i = (1+w_i)\frac{Q_{grid}}{N} + \frac{(Q_{grid} - Q'_{grid})}{N} \quad (8)$$

The reactive-power command values corresponding to the individual wind turbines may be calculated thereafter by detecting the actual reactive power at the interconnection node A at predetermined time intervals and substituting the difference in reactive power determined from the detection results, namely, $\Delta Q_{grid} = Q_{grid} - Q_{grid}'$ and the reactive power correction levels $w_i$ into equation (8) above.

In this way, feedback control can be performed to stabilize the reactive power at the interconnection node A.

As described above, because the wind turbine generator system 1 and the operation control method therefor according to this embodiment determine reactive-power command values appropriate for the individual wind turbines by correcting the reactive-power command value for the interconnection node A using the reactive power correction levels $w_i$ corresponding to the reactances present between the individual wind turbines and the interconnection node A, reactive power control taking into account the reactances related to the power lines 30 can be performed in the individual wind turbines. This realizes further stabilization of the reactive power at the interconnection node A.

Second Embodiment

Figure 4:
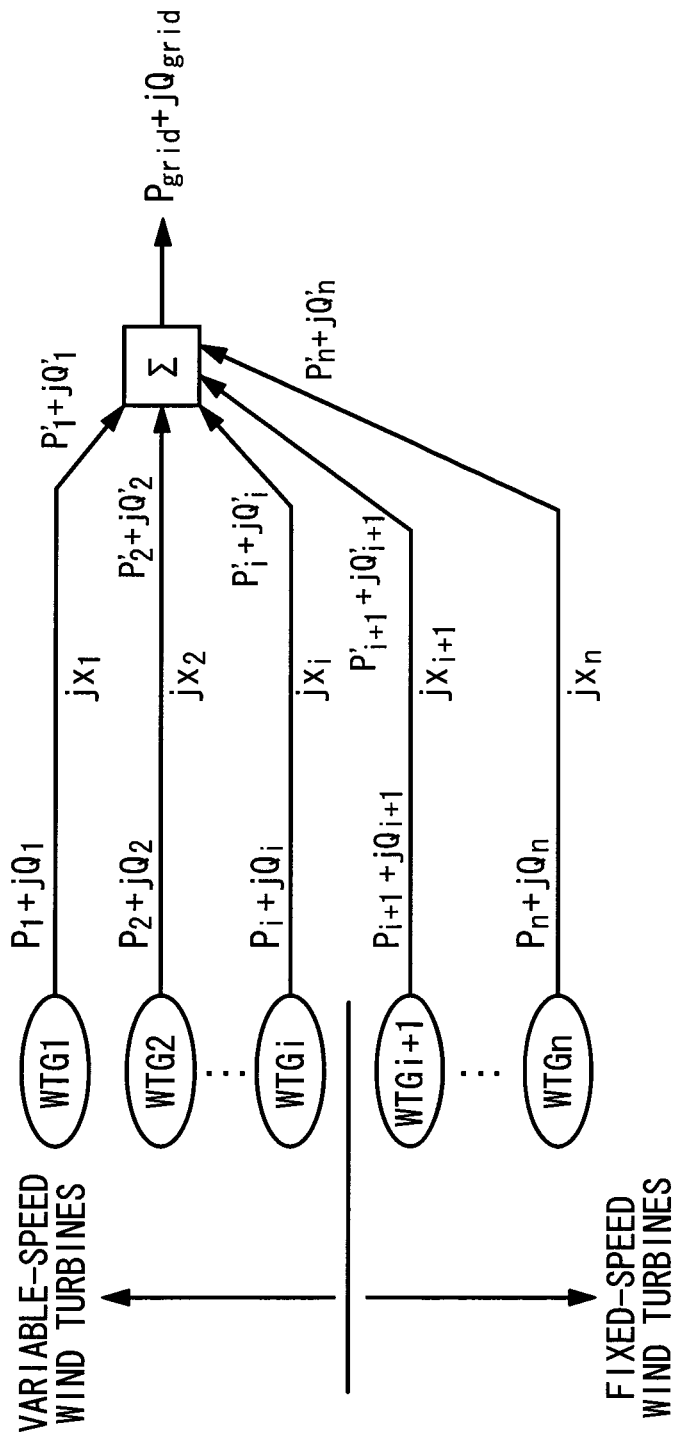
FIG. 4 is a diagram illustrating an operation control method for a wind turbine generator system according to a second embodiment of the present invention.

Next, a second embodiment of the present invention will be described using FIG. 4.

While the case where all wind turbines are variable-speed wind turbines has been described in the first embodiment described above, the case where some wind turbines are fixed-speed wind turbines will be described in this embodiment.

A wind turbine generator system according to this embodiment includes at least one fixed-speed wind turbine and at least one variable-speed wind turbine. As shown in FIG. 4, for example, the first to i-th wind turbines are variable-speed wind turbines, whereas the i+1-th to n-th wind turbines are fixed-speed wind turbines. In this case, first, the reactive powers $Q_i$ at the output ends of the wind turbines and the reactive powers $Q_i'$ at the interconnection node A are determined by power flow calculation based on the same procedure as in the first embodiment described above.

Subsequently, the sums of the reactive powers of the fixed-speed wind turbines alone are determined as shown in equations (9) and (10) below.

[Eq. 6]

$$Q_{fix} = \sum_{i=i+1}^{n} Q_i \quad (9)$$

$$Q'_{fix} = \sum_{i=i+1}^{n} Q'_i \quad (10)$$

Next, the difference $\Delta Q_{fix}$ between the sum of the reactive powers at the output ends of the fixed-speed wind turbines as a whole and the sum of the reactive powers at the interconnection node A is determined by equation (11) below.

$$\Delta Q_{fix} = Q_{fix} - Q_{fix}' \quad (11)$$

The difference $\Delta Q_{fix}$ needs to be absorbed by the variable-speed wind turbines.

Here the rate of contribution of the reactive power supplied from the fixed-speed wind turbines to the reactive-power command for the interconnection node A can be represented by equation (12) below, and the balance, namely, $(1-\alpha)Q_{grid}$, needs only to be supplied by the variable-speed wind turbines.

$$\alpha = Q_{fix}'/Q_{grid} \quad (12)$$

Hence, taking into account the above variations in the reactive powers of the fixed-speed wind turbines, the reactive-power command $Q_{grid\_var}$ that needs to be supplied by the variable-speed wind turbines as a whole is represented by equation (13) below.

[Eq. 7]

$$Q_{grid\_var} = (1-\alpha)Q_{grid} \quad (13)$$

After the reactive-power command that needs to be supplied by the variable-speed wind turbines as a whole is determined in this way, the reactive-power command is divided by the number of variable-speed wind turbines to determine a uniform reactive-power command imposed on the individual wind turbines, and the reactive-power command is further corrected using the reactive power correction levels $w_i$ corresponding to the individual wind turbines. Thus, the reactive-power commands finally provided to the individual wind turbines are represented by equation (14) below. In equation (14), M is the number of variable-speed wind turbines.

[Eq. 8]

$$Q_i = (1-w_i)\frac{(1-\alpha)Q_{grid}}{M} \quad (14)$$

The corrected reactive-power command values determined using equation (13) above are transmitted to the respective wind turbines.

As described above, if fixed-speed wind turbines and variable-speed wind turbines are both present, because the wind turbine generator system and the operation control method therefor according to this embodiment determine a reactive-power command value for the variable-speed wind turbines as a whole by taking into account variations in the reactive powers of the fixed-speed wind turbines, the variable-speed wind turbines can absorb the variations in reactive power due to the fixed-speed wind turbines. This improves the accuracy of reactive power control even if fixed-speed wind turbines are included.

Instead of the embodiment described above, for example, a command value obtained by dividing the reactive-power command value $Q_{grid\_var}$ represented by equation (13) above, for the variable-speed wind turbines as a whole by the number M of variable-speed wind turbines may be provided as a reactive-power command value for the individual variable-speed wind turbines. Although in this case variations in reactive power due to reactors present between the individual variable-speed wind turbines and the interconnection node A are not offset, a considerable advantage can be achieved in that the variations in reactive power due to the fixed-speed wind turbines can be offset.

Although the embodiments of the present invention have been described above in detail with reference to the drawings, specific configurations are not limited to those of the embodiments; design changes etc. are encompassed without departing from the spirit of the present invention.

For example, although the central controller 10 corrects the reactive-power command value in the embodiments described above, the reactive-power command value may instead be corrected, for example, in the individual wind turbines. In this case, a uniform reactive-power command value is transmitted from the central controller 10 to the individual wind turbines, and the uniform reactive-power command value received from the central controller 10 is corrected in the individual wind turbines using the respective reactive power correction levels possessed by the individual wind turbines.

In addition, although the corrected reactive-power command values etc. are transmitted from the central controller 10 by communication in the above embodiments, a configuration may be employed in which, for example, the operator manually inputs the reactive-power command values to the respective wind turbines.

In addition, although the reactive-power command values provided to the individual wind turbines are determined based on the reactive-power command value for the interconnection node in the embodiments described above, an aspect may instead be employed in which, for example, the central controller 10 acquires a voltage command value for the interconnection node as input information and generates the reactive-power command values so that the voltage command value for the interconnection node agrees with the actual voltage value at the interconnection node.

In the embodiments described above, additionally, the central controller 10 provides the reactive-power command values to the individual wind turbines, and the generator outputs of the individual wind turbines are controlled based on the reactive-power command values and the active-power command values determined based on and the rotational speeds of the generators. However, the desired active power and the desired reactive power cannot be output if the square root of the sum of the squares of the active power and the reactive power, namely, the apparent power, exceeds the rated capacity. In this case, either reducing the active power for priority to the reactive power or reducing the reactive power for priority to the active power must be selected.

In case of such a situation, it is possible to set which is given priority in advance so that the control can be performed based on that setting if the above event occurs. It is also possible to notify the operator if the above event occurs and to allow the operator to input which is given priority each time.

The invention claimed is:

1. An operation control method for a wind turbine generator system having a plurality of individual wind turbines, a central controller for providing control commands to the individual wind turbines, and output powers of the individual wind turbines being supplied to a utility grid via a common interconnection node, the operation control method for a wind turbine generator system comprising:

determining reactive-power command values corresponding to the individual wind turbines by correcting a predetermined reactive-power command value for the interconnection node using reactive power correction levels set for the individual wind turbines, wherein the determined reactive-power command values of at least two of the plurality of the individual wind turbines are different from each other.

2. The operation control method for the wind turbine generator system according to claim 1, further comprising:

determining the reactive power correction levels based on reactance components present between the individual wind turbines and the interconnection node.

3. An operation control method for a wind turbine generator system having a plurality of wind turbines, a central controller for providing control commands to the wind turbines, and outputs of the wind turbines being supplied to a utility grid via a common interconnection node, the operation control method comprising:

determining if the plurality of wind turbines includes both variable-speed wind turbines and fixed-speed wind turbines, and when the plurality of wind turbines includes both variable-speed wind turbines and fixed-speed wind turbines, calculating the overall reactive power of the fixed-speed wind turbines at the interconnection node;

calculating the difference between the calculated overall reactive power and a predetermined reactive-power command value for the interconnection node;

correcting the predetermined reactive-power command value using the calculated difference; and determining reactive-power command values corresponding to the variable-speed wind turbines based on the corrected predetermined reactive-power command value, wherein the determined reactive-power command values of at least two of the variable-speed wind turbines are different from each other.

4. The operation control method for the wind turbine generator system according to claim 3, wherein determining the reactive-power command values corresponding to the variable-speed wind turbines including correcting the corrected predetermined reactive-power command value using reactive power correction levels corresponding to the variable-speed wind turbines.

5. The operation control method for the wind turbine generator system according to claim 4, further comprising:

determining the reactive power correction levels corresponding to the variable-speed wind turbines based on reactance components present between the variable-speed wind turbines and the interconnection node.

6. A wind turbine generator system comprising:

a plurality of individual wind turbines, a central controller for providing control commands to the individual wind turbines, and a common interconnection node for supplying output powers of the individual wind turbines being supplied to a utility grid, wherein the central controller is configured to determine reactive-power command values corresponding to the individual wind turbines by correcting a predetermined reactive-power command value for the interconnection node using reactive power correction levels set for the individual wind turbines, wherein the determined reactive-power command values of at least two of the plurality of the individual wind turbines are different from each other.

7. A wind turbine generator system comprising:

a plurality of individual wind turbines, a central controller for providing control commands to the individual wind turbines, and a common interconnection node for supplying outputs of the individual wind turbines to a utility grid, wherein the plurality of individual wind turbines includes both variable-speed wind turbines and fixed-speed wind turbines, and the central controller is configured to:
- calculate the overall reactive power of the fixed-speed wind turbines at the interconnection node;
- calculate the difference between the calculated overall reactive power and a predetermined reactive-power command value for the interconnection node;
- correct the predetermined reactive-power command value using the calculated difference; and
- determine reactive-power command values corresponding to the variable-speed wind turbines based on the corrected predetermined reactive-power command value, wherein the determined reactive-power command values of at least two of the variable-speed wind turbines are different from each other.

* * * * *